United States Patent [19]
Suga et al.

[11] Patent Number: 5,382,482
[45] Date of Patent: Jan. 17, 1995

[54] ZINC ELECTRODE FOR ALKALINE STORAGE BATTERY

[75] Inventors: Masanobu Suga, Yokohama; Seiichi Akita, Fujisawa; Nobuyuki Kuroda, Yokohama, all of Japan

[73] Assignee: Nippon Oil Company, Limited, Tokyo, Japan

[21] Appl. No.: 99,174

[22] Filed: Jul. 29, 1993

[30] Foreign Application Priority Data
Aug. 7, 1992 [JP] Japan .................................. 4-251812
Aug. 12, 1992 [JP] Japan .................................. 4-255323

[51] Int. Cl.6 ............................................. H01M 10/24
[52] U.S. Cl. ............................ 429/206; 429/216; 429/229
[58] Field of Search .................... 429/229-231, 429/216, 247, 248, 249, 137, 212, 206

[56] References Cited
U.S. PATENT DOCUMENTS

| | | | |
|---|---|---|---|
| 3,053,924 | 9/1962 | Strauss et al. | 429/216 |
| 3,892,594 | 7/1975 | Charlesby et al. | 429/137 X |
| 4,245,016 | 1/1981 | Rampel | 429/216 |
| 4,407,913 | 10/1983 | Rampel | 429/137 |

FOREIGN PATENT DOCUMENTS
3-1457A 1/1991 Japan .

Primary Examiner—Anthony Skapars
Attorney, Agent, or Firm—Dilworth & Barrese

[57] ABSTRACT

According to the present invention there is provided a negative zinc electrode for an alkaline storage battery, comprising an electrode using zinc as an active material and a polymer layer which is substantially in direct contact with the electrode, the polymer layer containing at least a polymer having a crosslinked structure. There is also provided an alkaline storage battery using such negative zinc electrode and in which the occurrence of dendrites and shape change is suppressed.

9 Claims, 3 Drawing Sheets

FIG_1

FIG_2

ZINC ELECTRODE FOR ALKALINE STORAGE BATTERY

BACKGROUND OF THE INVENTION

The present invention relates to an alkaline storage battery using zinc as a negative electrode such as, for example, a nickel-zinc, silver-zinc or zinc-manganese storage battery and particularly to an improvement of the zinc electrode used as a negative electrode.

An alkaline secondary battery using zinc as a negative electrode has a high energy density and a good output characteristic and can be produced inexpensively, so it is expected as a power source for portable devices and electric vehicles.

However, since the solubility of zinc as an active material of the negative electrode is high, there arise problems. For example, zincate ions which have been dissolved out during electric discharging form dendrites and cause a short circuit, or the electrode itself undergoes a change in shape, resulting in lowering of the utilization factor. Due to these problems, an alkaline secondary battery using zinc as a negative electrode and having a sufficiently long cycle life has not been obtained yet.

For solving the above problems, various improvements have been made with respect to electrolyte, separator and electrode. However, there has not been obtained yet an alkaline secondary battery using zinc as a negative electrode and having a sufficiently long cycle life.

Particularly, the separator is generally known as means for suppressing dendrite physically, and various studies have been made using polyolefin non-woven fabric and other materials. The separator is required to have ion conductivity, gas permeability and capability of preventing a short circuit caused by dendrites. To meet these requirements, improvements have been made; for example, a metal is held in the separator (Japanese Patent Laid Open Nos. 197758/1982 and 63672/1984), a copolymer is used as the separator material (Japanese Patent Publication No. 24660/1980 and Patent Laid Open No. 253152/1985), or the separator is treated with a surface active agent (Japanese Patent Laid Open No. 141951/1992). However, these methods involve a complicated process and therefore a method capable of affording a satisfactory effect through a simpler process has been desired.

Moreover, zincate ions which were dissolved out into an electrolyte layer during electric discharge are segregated onto electrodes at the time of charging, resulting in a shape change of the electrodes and decrease in the charge and discharge capacity of the battery. It has been impossible to prevent such inconvenience even by improvement of the separator.

Further, applying a polyvinyl alcohol directly to electrodes to improve the cycle characteristic in a bound state to the separator has also been tried, as shown in Japanese Patent Laid Open No. 1457/1991. However, the cycle characteristic is not satisfactory in practical use because the polyvinyl alcohol used as a binder is not considered satisfactory in its ability of preventing the growth of dendrite.

It is the object of the present invention to overcome the above-mentioned problems, particularly to provide a storage battery using zinc as a negative electrode in which the cycle characteristic is improved by suppressing dendrite and shape change in an initial stage thereof.

SUMMARY OF THE INVENTION

Having made intensive studies along the above object, the present inventors found out that by disposing, in close proximity to zinc as an active material, a polymer layer containing at least a polymer which has a crosslinked structure and allowing the active material, zinc, of an alkaline storage battery to act on an electrolyte substantially through the polymer layer, it was made possible to suppress dendrites and shape change of the negative zinc electrode. In this way the present invention was accomplished.

The present invention relates to a negative zinc electrode for an alkaline storage battery, having a polymer layer which is substantially in direct contact with an electrode using zinc as an active material, the polymer layer containing at least a polymer which has a crosslinked structure, as to well as an alkaline storage battery using such negative zinc electrode.

The present invention also resides in a method for making a negative zinc electrode for an alkaline storage battery, including the steps of forming on a zinc electrode a coating containing at least a polymer precursor which is in the state of sol and then causing gelation of the precursor sol to form a polymer layer substantially in direct contact with the zinc electrode, the polymer layer containing at least a polymer which has a crosslinked structure.

DESCRIPTION OF THE PREFERRED EMBODIMENTS

Figure 1:
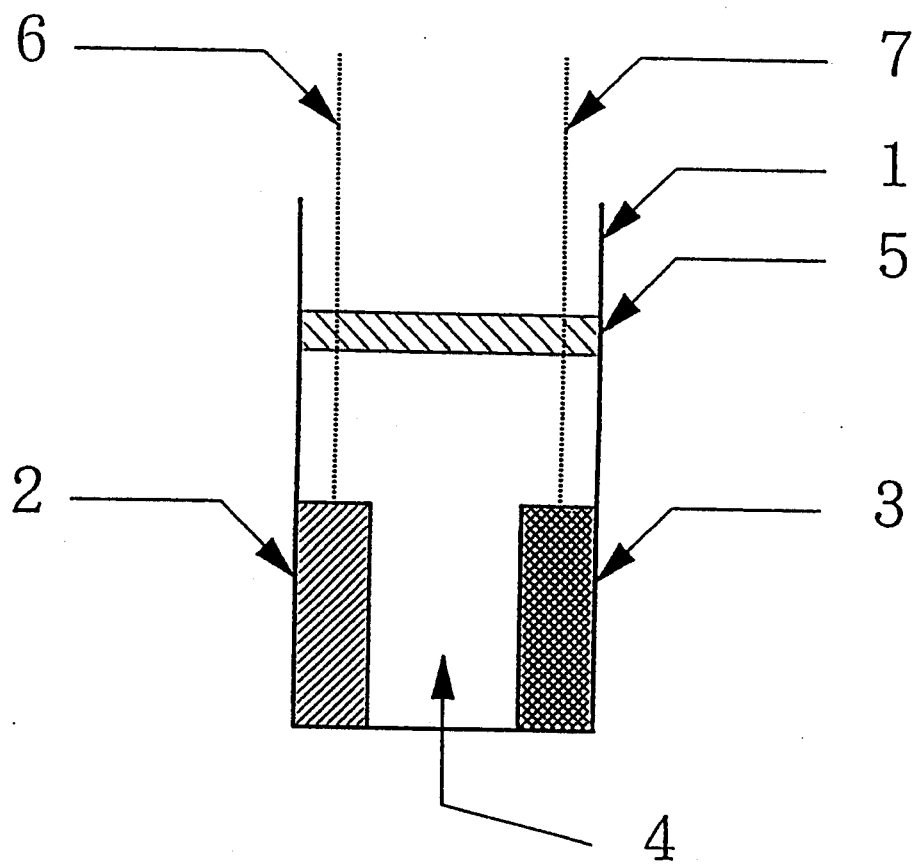
FIG. 1 is a sectional view showing the construction of a battery cell used in Example 1.

In the drawings, reference numeral 1 denotes a glass cell, numeral 2 denotes a negative electrode, numeral 3 denotes a positive electrode (Ni electrode), numeral 4 an electrolyte, numeral 5 a liquid paraffin, numeral 6 a negative electrode terminal and numeral 7 a positive electrode terminal.

The polymer (hereinafter referred to as "polymer (I)") which constitutes the polymer layer as referred to herein contains at least a polymer having a crosslinked structure. Usually, the crosslinked structure is present along the surface of the polymer layer almost uniformly throughout the entire surface. But in the thickness direction of the polymer layer the crosslinked structure may be present uniformly or non-uniformly. As the case may be, the crosslinked structure may be present only along the polymer layer surface and in the vicinity thereof.

Generally, it is known that a polymer having a crosslinked structure is insoluble in ordinary solvents.

The proportion of a component contained in the polymer (I) and insoluble in ordinary solvents is usually in the range of 20 to 100 wt %, preferably 50 to 100 wt %. Even if a component soluble in the solvent (including electrolyte) is contained in the polymer (I), there will be attained a satisfactory dendrite suppressing effect if a crosslinked structure is present along the polymer layer surface and in the vicinity thereof nearly uniformly throughout the whole. But if the proportion of the insoluble component is less than 20 wt %, the dendrite suppressing effect based on the crosslinked structure will not be satisfactory.

The polymer (I) used in the present invention is not specially limited if only it has a crosslinked structure partially or wholly. However, in order that the alkaline storage battery using the negative zinc electrode of the present invention may exhibit its performance to a satisfactory extent, it is desirable that the polymer (I) have a sufficient ion conductivity in the electrolyte used and be satisfactory in both gas permeability and mechanical strength.

For the above reason it is desirable that the polymer (I) contain at least one polymer which is crosslinked partially or wholly and which is selected from the group consisting of later-described polymer (A), polymer (polymer (A') hereinafter) obtained by substituting a portion of the main chain of the polymer (A) with a group (B), polymer (C), and polymer (polymer (C') hereinafter) obtained by substituting a portion of the main chain of the polymer (C) with a group (D).

Where required, the polymer (I) may further contain a polymer (E) which will be described later, a polymer obtained by crosslinking a portion or the whole of the polymer (E), as well as polymers (A), (A'), (C) and (C') which are not crosslinked.

It is desirable for the polymer (I) to contain a polymer (polymer (A) hereinafter) having a high ion conductivity of about $10^{-3}$ to $10^1$ S/cm in an alkaline electrolyte and/or a crosslinked product of the polymer (A). This is because of a lowering in internal impedance of the battery and reduced influence on the charge and discharge characteristic.

As examples of such polymer (A) there are mentioned polyvinyl alcohol, polyacrylonitrile, carboxymethyl cellulose, polyacrylic acid, polyacrylate, polymethacrylic acid, polymethacrylate, polyvinyl pyrrolidone, polyparabanic acid, polyoxazoline, polyethylene oxide and sodium polystyrenesulfonate.

If a group (group (B) hereinafter) which is effective in improving the gas permeability of the polymer (A) is introduced into a portion of the main chain of the polymer (A), hydrogen which is generated from the negative electrode due to self-discharge will be prevented from staying in the interior of the electrode, and oxygen which is generated from the positive electrode at the time of charging can be consumed at the negative electrode due to a so-called Neumann effect. Thus, the introduction of the group (B) is desirable. The polymer thus obtained by introducing the group (B) into a portion of the main chain of the polymer (A) will hereinafter be referred to as polymer (A').

As the group (B) there is used at least one member selected from the group consisting of, for example, $-SiR_3$, $-(OSi)_n OR'$ and $-CH_2CH(CH_3)_2$ where R and R' each represent a hydrogen atom or an alkyl group having 1 to 4 carbon atoms.

The group (B) can be introduced into the polymer (A), for example, by a method of grafting the group (B) to the polymer (A) or a method of copolymerizing a constituent monomer of the polymer (A) with a monomer having the group (B).

The proportion the group (B) is to be introduced into the polymer (A) is not specially limited. A suitable proportion can be selected according to a purpose to be attained. Generally, the group (B) is introduced in a proportion of usually 1 to 20 units, preferably 7 to 14 units, for 10 monomer units of the polymer (A).

The ratio of the total amount of polymer (A) and polymer (A') used as necessary to the polymer (I) is usually in the range of 20 to 100 wt %, preferably 50 to 100 wt %. If it is less than 20 wt %, the ion conductivity of the polymer layer will be low and there will not be attained a satisfactory charge and discharge characteristic of the storage battery.

It is also preferable for the polymer (I) to contain a polymer (polymer (C) hereinafter) superior in gas permeability, having an oxygen permeability constant of larger than $1 \times 10^{31\ 10}$ cm$^3$ (STP) cm$^{-1}$S$^{-1}$cmHg$^1$, and-/or a crosslinked product of the polymer (C).

As examples of the polymer (C) there are mentioned polyorganosiloxanes, polyvinyltriorganosiloxanes, polyalkylsulfones and poly(4-methylpentene-1). Particularly, polymers having a siloxane main chain are superior in gas permeability, so the incorporation thereof in the polymer (I) is effective in increasing the degree of freedom in setting the thickness of the polymer layer, and it becomes possible to form the polymer layer thick to the highest degree of the dendrite suppressing effect.

If a group (group (D) hereinafter) which is effective in improving the ion conductivity of the polymer (C) is introduced in part of the main chain of the polymer (C), an internal impedance of the storage battery will be decreased to improve the charge and discharge characteristic. Thus, the introduction of the group (D) is particularly preferred. The polymer thus obtained by introducing the group (D) in part of the main chain of the polymer (C) will hereinafter be referred to as polymer (C').

The group (D) comprises one or more dissociative groups or polar groups selected from the group consisting of, for example, $-COOH$, $-CN$, $-CONH_2$ and $-N^+R_3$ where R is a hydrogen atom or an alkyl group having 1 to 4 carbon atoms. The group (D) can be introduced into the polymer (C), for example, by a method of grafting the group (D) to the polymer (C) or a method of copolymerizing a precursor of the polymer (C) with a monomer having the group (D).

It is desirable that the group (D) be introduced usually 1 to 20 units, preferably 5 to 15 units, for 10 monomer units of the polymer (C). If the proportion of the group (D) is less than 1 unit, there will not be attained a satisfactory effect, and if it exceeds 10 units, it is likely that the polymer (C') will no longer be able to maintain a sufficient oxygen permeability constant. Thus, both such proportions are undesirable.

The ratio of the total amount of the polymer (C) and the polymer (C') used as necessary to the polymer (I) is usually in the range of 20 to 100 wt %, preferably 50 to 100 wt %. If it is less than 20 wt %, the polymers (C) and (C') will not be fully effective in improving the oxygen permeability of the polymer layer.

Where required, the polymer (I) may further contain a polymer (polymer (E) hereinafter) for imparting curability and flexibility thereto, and/or a crosslinked product thereof, in addition to the polymers described above.

As examples of the polymer (E) there are mentioned polystyrene, polycarbonate, polyvinyl chloride and polyethylene terephthalate.

The proportion of the polymer (E) and/or a crosslinked product thereof relative to the polymer (I) is not specially limited and a suitable proportion thereof can be selected as necessary. But usually it is in the range of 2 to 50 wt %, preferably 5 to 20 wt %, relative to the polymer (I). If the proportion thereof is smaller than 2 wt %, it will be difficult to obtain the effect of use those polymers, and if it is larger than 50 wt %, it will be difficult to maintain the foregoing oxygen permeability constant and afford ion conductivity, so both such values are undesirable.

A suitable thickness of the polymer layer can be selected according to the kind of the polymer (I) used, desired ion conductivity, oxygen permeability constant and durability of the polymer coating, interelectrode distance, separator thickness, mechanical strength of the electrode and the amount of zinc active material. In a dry condition, it is usually in the range of 0.01 to 2.00 mm, preferably 0.05 to 0.5 mm. If the polymer layer thickness is smaller than 0.01 mm, there usually will not be attained a satisfactory dendrite suppressing effect, and if it is larger than 2.00 mm, the oxygen permeability or ion conductivity will not be satisfactory. Thus, both such values are undesirable.

In the present invention, moreover, if a polymer which is swollen by a component of the electrolyte, e.g. water, is contained in the polymer layer, then when the negative zinc electrode is immersed in the electrolyte, a thin electrolyte layer may be formed in part or the greater part between the zinc active material and the polymer layer and thus there can be obtained a storage battery having a particularly superior discharge characteristic. Thus, the presence of such polymer is very desirable.

The negative zinc electrode for an alkaline storage battery using zinc as an active material in the present invention has the polymer layer of the polymer (I) which is constructed as above and which is substantially in direct contact with the negative zinc electrode. The following description is now provided about a polymer layer forming method and that of an electrode producing method.

The polymer (I) which constitutes the polymer layer has a crosslinked structure partially or wholly thereof, so for forming the polymer layer in direct contact with the electrode, it is generally desirable to adopt a method wherein a polymer (polymer (I') hereinafter) corresponding to the polymer (I) prior to being crosslinked is once coated onto the electrode and thereafter reacted for crosslinking.

As the polymer (I') there is used, for example, at least one member selected from the group consisting of polymers (A), (A'), (C) and (C'), and if necessary, polymer (E) may be contained therein.

How to form a coating of the polymer (I') on the electrode is not specially limited. A suitable method can be selected according to the kind, properties and viscosity of the polymer (I'), electrode shape, etc. Generally, there is adopted a method wherein the polymer (I') is heat-melted to form a coating thereof, or a method wherein the polymer (I') is dissolved in a solvent to form a coating thereof.

There also may be adopted a method wherein a coating is formed using a precursor (precursor (J) hereinafter) of the polymer (I') in place of part or the whole of the polymer (I') and thereafter the precursor (J) is made into the polymer (I') to give a coating of the polymer (I').

For example, according to the method of heat-melting the polymer (I') to form a coating thereof, the polymer (I') is melted usually at a temperature of 120° to 200° C. and then a coating thereof is formed on the zinc electrode by application, spin coating or dip coating, followed by cooling.

According to the method of dissolving the polymer (I') in a solvent to form a coating thereof, the polymer (I') is dissolved in a solvent capable of dissolving the polymer (I'), more specifically, a solvent selected according to the kind of the polymer (I') used from among those commonly used as solvents such as, for example, water, ethanol and toluene, then a coating thereof is formed on the zinc electrode by application, spin coating or dip coating, and thereafter the solvent is removed by heat-drying for example.

Further, according to the method of making the precursor (J) into the polymer (I') to form a coating of the polymer (I'), first a coating of the precursor (J) is formed by, for example, dip coating spin coating, spray coating or brush coating, followed by heating, light radiation or gelation. Alternatively, a curing accelerating component is incorporated beforehand into a coating solution containing the precursor (J), and after coating, reaction and curing are allowed to take place automatically or using a suitable means such as heating to obtain a coating of the polymer (I').

The precursor (J) is a compound wherein a portion or the whole of the constituent of the polymer (I') to be obtained is in the state of monomer or oligomer. That as the precursor (J), at least one member selected as the constituent of the polymer (I') from the group consisting of, for example, polymers (A), (A'), (C) and (C') may be used in the state of precursor partially or wholly.

In the case of using the polymer (A) in the state of precursor (precursor (F) hereinafter), examples of such precursor include vinyl acetate, acrylonitrile, acrylic acid, acrylate, methacrylic acid, methacrylate, vinyl pyrrolidone, oxazoline, methyl vinyl ketone, styrenesulfonic acid and acrylamide. Where required, these compounds may be used as a mixture of one or more thereof.

In the case of using the polymer (A') in the state of precursor (precursor (G) hereinafter), there may be used a compound obtained by introducing group (B) into the precursor (F).

It is also possible to crosslink the precursor (G), using a polyfunctional monomer, which monomer will be exemplified later.

In the case of using the polymer (C) in the state of precursor (precursor (H) hereinafter), examples of such precursor include organosilanes having various groups such as dimethylsilane, methylphenylsilane, dichlorodimethylsilane and dimethyldiethoxysilane, monomers such as 4-methylpentene-1 and 2,6-dimethylphenol, as well as low viscosity polymers and oligomers having such groups as —SiH, —SiCl, —SiCH=CH$_2$ and —SiCH$_2$SH. These compounds may be used as a mixture of one or more thereof as necessary.

In the case of using the polymer (C') in the state of precursor (precursor (K) hereinafter), there may be used a compound obtained by introducing group (D) into the precursor (H).

Where required, polymer (E) or a precursor (precursor (L) hereinafter) of the polymer (E) may be contained in the precursor (J). As examples of the precursor (L) there are mentioned styrene, bisphenol A, vinyl chloride and terephthalic acid.

In this way there can be formed a coating of the polymer (I') on the electrode.

Next, the polymer (I') coating formed on the electrode is crosslinked by the application thereto of an electron beam or a radiation or by using a crosslinking agent or a crosslinking aid, whereby there can be obtained a layer of the polymer (I). The polymer (I) layer can be obtained also by a method wherein the functional group contained in the polymer (I') is reacted with a crosslinking agent.

The above method of using electron beam or radiation for crosslinking is not specially limited. There may be used a conventional known method.

The crosslinking agent is not specially limited, either. A suitable crosslinking agent can be selected according to the kind of the polymer contained in the polymer (I') and the crosslinking method used.

As examples of the crosslinking agent there are mentioned sulfur and sulfur homologues such as sulfur, imidazoline, thazole, zinc dimethyldithiocarbamate and thiol, as well as accelerators therefor, organic peroxides such as benzoyl peroxide, dicumyl peroxide, methaphenilene bismaleimide and quinone oxime, as well as crosslinking aids, azo compounds such as diazoaminobenzene and bis-azo ester, organomethallic compounds such as tetraethoxytitanium and dibutyltin oxides and polyfunctional organic compounds such as tolylene diisocyanate and glycidyl methacrylate. A suitable crosslinking agent can be selected according to the purpose.

In the case where crosslinking is performed using such crosslinking agent, since the coating of the polymer (I') is very thin, it is possible to adopt a method wherein the crosslinking agent is contacted with the coating. Alternatively, the crosslinking agent may be mixed beforehand into the polymer (I').

Other than the above methods, as a method for obtaining a negative zinc electrode for an alkaline storage battery using the precursor (J), there is mentioned a method wherein a polyfunctional monomer or a reactive oligomer is incorporated beforehand into a coating solution which contains the precursor (J), and after the formation of a coating, there is performed a treatment such as light radiation or heating to obtain a polymer having a crosslinked structure.

As examples of the polyfunctional monomer referred to above there are mentioned polyfunctional organic crosslinking agents such as N,N-methylenebisacrylamide, vinyl sulfone, diacrylate, triacrylate, dimethacrylate, trimethacrylate, divinylbenzene and tolylene diisocyanate, and various silane coupling agents, including vinyltrichlorosilane and tetraethoxysilane.

As examples of the reactive oligomer referred to above there are mentioned polyfunctional low-viscosity polymers and oligomers such as various polysiloxanes having functional groups at both ends thereof, including polyalkylene glycol dimethacrylate, polyalkylene glycol diacrylate and polymethylhydroxysiloxane.

In the precursor (J) there may be incorporated a monomer which alone induces a crosslinking reaction, or a combination of monomers each inducing a crosslinking reaction.

As examples of such monomers which alone induces a crosslinking reaction, there are mentioned methyl vinyl ketone, vinyl isocyanate and glycidyl methacrylate.

As examples of such combination of monomers each inducing a crosslinking reaction, there are mentioned methyl vinyl ketone and acrolein, diglycidyl ether or diisocyanate and various diamines, dithiols or diols.

Through the above steps there is formed a layer of the polymer (I) on the electrode, whereby there is obtained the negative zinc electrode for an alkaline storage battery of the present invention.

The alkaline storage battery according to the present invention uses the above negative zinc electrode in combination with a separator, a positive electrode and an electrolyte.

The positive electrode is not specially limited if only it is made of a material commonly used for an alkaline storage battery. Examples are a electrode containing nickel as a main component, an electrode containing silver as a main component, and an electrode containing manganese dioxide as a main component.

Also as to the separator, no special limitation is placed thereon if only it is a separator used in a conventional battery. Even when a separator not exhibiting a satisfactory dendrite suppressing effect is used in the invention, it is possible to obtain an alkaline storage battery having a sufficient cycle life in practical use because the negative electrode itself has satisfactory dendrite suppressing function and shape change preventing function. As examples of separators employable in the invention there are mentioned cellophane, porous glass, polyethylene non-woven fabric and polypropylene non-woven fabric. Also employable are conventional separators having a dendrite suppressing function such as, for example, a non-woven fabric treated with a surface active agent and a non-woven fabric with a metal such as nickel adhered thereto. Further, the separator can be omitted and the battery can be constituted by only negative and positive electrodes and a solution holding layer provided between both electrodes. This depends on properties of the polymer layer formed on the negative electrode. Moreover, since the polymer layer on the negative electrode does not have electronic conductivity, the battery can be constituted by only positive and negative electrodes as long as the negative zinc electrode possesses a sufficient solution holdability.

The electrolyte used in the present invention contains an aqueous alkali solution as a main component. No special limitation is placed thereon if only it is one used in an ordinary alkaline storage battery. As examples of a principal component of the electrolyte there are mentioned aqueous sodium hydroxide solution, aqueous potassium hydroxide solution and aqueous lithium hydroxide solution. Various additives used in a conventional alkaline storage battery may be incorporated in the electrolyte according to purposes. Examples of such additives include zince oxide, lead oxide and organic surfactants.

If a polymer which is swollen by a component of the electrolyte, e.g. water, is contained in the polymer layer on the negative zinc electrode for the alkaline storage battery of the invention, then when the negative zinc electrode is immersed in the electrolyte, a thin electrolyte layer may be formed in part or the greater part between the zinc active material and the polymer layer and thus there can be obtained a storage battery having a particularly superior discharge characteristic.

In the negative zinc electrode for an alkaline storage battery obtained according to the present invention, the development of dendrite and that of shape change are diminished to a remarkable extent by the action of the polymer layer having a crosslinked structure and formed substantially in direct contact with the surface of the negative zinc electrode, so that the storage battery using such negative zinc electrode has a sufficiently long cycle life.

In such negative zinc electrode according to the present invention, moreover, if a polymer which is swollen by a component of the electrolyte, e.g. water, is contained in the polymer layer, then when the negative zinc electrode is immersed in the electrolyte, a thin electrolyte layer may be formed in part or the greater part between the zinc active material and the polymer layer, and thus a storage battery having a particularly superior discharge characteristic can be obtained.

The following examples are given to illustrate the present invention more concretely, but it is to be understood that the invention is not limited by those examples.

EXAMPLE 1

Production of Zinc Electrode 4 ml of a 5 wt % aqueous polyvinyl alcohol solution was added to 6.0 g of zinc oxide, 3.0 g of zinc powder having an amalgamation rate of 3 wt % and 0.1 g of tetrafluoroethylene, followed by kneading, then the kneaded mixture was applied to a portion (2 cm long by 20 cm wide) of a plate-like 20-mesh copper net (5 cm long by 20 cm wide), followed by rolling with a roller and drying, to obtain a zinc electrode having an electrode area of 40 $cm^2$. The zinc electrode was then cut into electrodes each having an electrode area of 2 $cm^2$ for use in experiment.

Coating of Zinc Electrode

Hydrochloric acid was added into 10 ml of a 10 wt % aqueous polyvinyl alcohol solution to adjust the pH value of the solution to 3. Further, 1.0 g of dimethyldiethoxysilane was added, followed by heating at 60° C. for 5 hours under stirring, to afford sol for use as a coating solution. Then, the above zinc electrode was dipped in the coating solution and dipped up, then dried by heating at 80° C. for 1 hour, whereby there was obtained a zinc electrode for an alkaline storage battery having a polymer layer about 200 $\mu$m thick which was substantially in direct contact with the zinc electrode surface.

A polymer film corresponding to the above polymer layer was subjected to Soxhlet extraction for 6 hours using water and 6 hours using toluene, then an insolubles content was determined from the residue; as a result, it was found to be 76 wt %, thus proving the presence of a crosslinked structure.

A battery cell having an internal volume of 1 cm long by 1 cm wide by 5 cm high was formed using a sintered type nickel electrode (electrode area: 2 $cm^2$) as a counter electrode and a 30 wt % aqueous potassium hydroxide solution as electrolyte, without using a separator. Then, using this battery cell, there was conducted a charge and discharge test. (Constant temperature 20° C., charging current 10 mA, charging end potential 1.92 V, discharge current 20 mA, discharge end potential 1.2 V).

Figure 3:
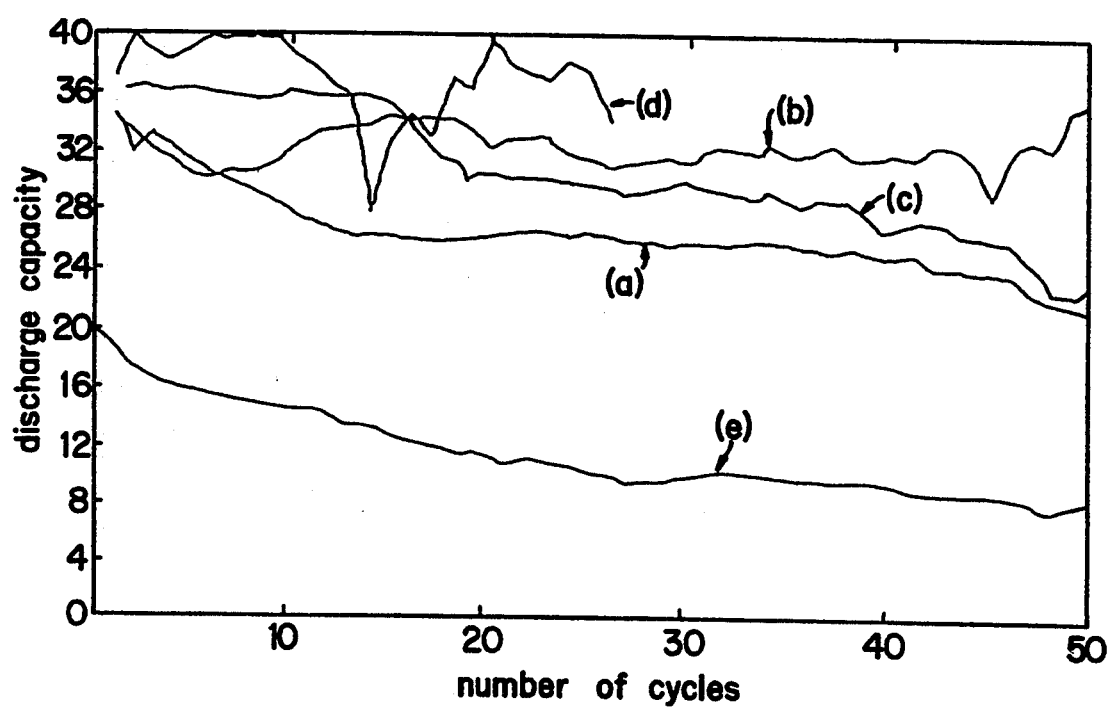
FIG. 3 is a graph showing charge and discharge characteristics obtained in working examples and comparative examples.

The construction of the battery cell is as shown in FIG. 1, and a cycle characteristic obtained is shown as battery (a) in FIG. 3.

EXAMPLE 2

Coating of Zinc Electrode

For 10 units of polymethylhydrosiloxane $+Si(CH_3)O+$, vinylacetic acid and 1-heptene were grafted to 5 and 3 units, respectively, using chloroplatinic acid as catalyst, to prepare a coating solution.

Into the coating solution was then added polydimethylsiloxane having vinyl groups at both ends thereof in an amount sufficient to react with 2 units of the above polymethylhydrosiloxane. Immediately thereafter, the zinc electrode obtained in Example 1 was dipped in the coating solution, then pulled up and heat-cured at 60° C. for 1 hour to afford a negative zinc electrode for an alkaline storage battery having a polymer layer about 100 $\mu$m thick which was substantially in contact with the zinc electrode surface.

A polymer film corresponding to the above polymer layer was subjected to Soxhlet extraction for 6 hours using water and 6 hours using toluene, and an insolubles content was determined from the residue; as a result, it was found to be 94 wt %, thus proving the presence of a crosslinked structure.

Figure 2:
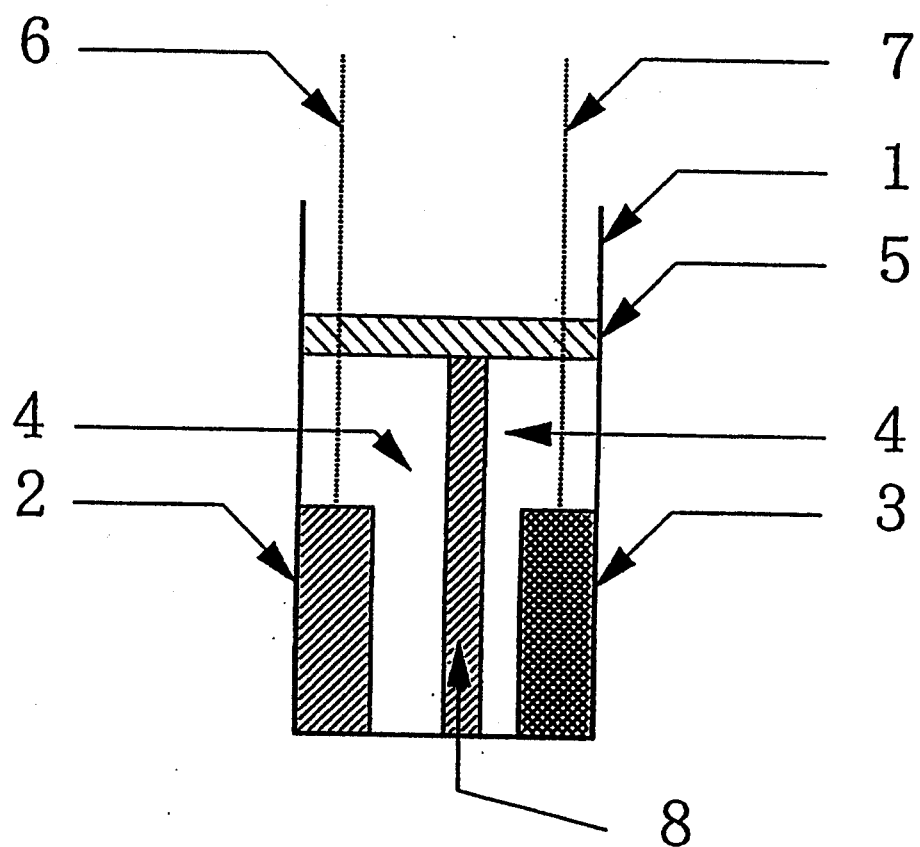
FIG. 2 is a sectional view showing the construction of a battery cell used in Example 2.

Using the negative zinc electrode for an alkaline storage battery thus produced, a battery cell shown in FIG. 2 was formed and a charge and discharge test was conducted under the same conditions as in Example 1. A cycle characteristic obtained in this test is shown as battery (b) in FIG. 3.

EXAMPLE 3

10 ml of a 10 wt % aqueous polyvinyl alcohol solution was used as a coating solution. The same zinc electrode as that used in Example 1 was dipped in the coating solution, then pulled up and heat-dried at 80° C. for 1 hour. The thus-coated zinc electrode was then dipped in a 10 wt % solution of tetraisopropoxytitanium in toluene and pulled up, whereby a crosslinking reaction was performed.

In this way there was obtained a negative zinc electrode for an alkaline storage battery having a thickness of about 30 $\mu$m which was substantially in contact with the zinc electrode surface.

A polymer film corresponding to the above polymer layer was subjected to Soxhlet extraction for 6 hours using water and 6 hours using toluene, and an insolubles content was determined from the residue to find that it was 82 wt %, thus proving the presence of a crosslinked structure.

Using the negative zinc electrode for an alkaline storage battery obtained above, there was conducted a charge and discharge test in the same way as in Example 1. The result obtained 15 shown as (c) in FIG. 3.

Comparative Example 1

A zinc electrode was fabricated in the same way as in Example 1 except that it was not coated with the polymer layer. Then, in the same manner as in Example 1, a battery cell was formed and a charge and discharge test was conducted. The result obtained is shown as (d) in FIG. 3.

In 27 cycles there occurred a short circuit due to the formation of dendrite and it became no longer possible to effect charge and discharge.

Comparative Example 2

The zinc electrode fabricated in Example 1 was dipped in a 15 wt % aqueous polyvinyl alcohol solution, then pulled up and heat-dried at 80° C. for 1 hour to form a polyvinyl alcohol layer about 100 $\mu$m thick substantially in direct contact with the zinc electrode surface, followed by a charge and discharge test in the same way as in Example 2. The result obtained is shown as (e) in FIG. 3.

A polyvinyl alcohol film corresponding to the above polyvinyl alcohol layer was subjected to Soxhlet extraction using water and toluene. As a result, there was no insoluble matter, that is, the polyvinyl alcohol layer was found to contain no crosslinked structure.

The electrodes fabricated in Examples 1 to 3 according to the present invention are each provided with a polymer layer having a crosslinked structure substantially in direct contact with the zinc active material, and the charge and discharge characteristics of the batteries using those electrodes, as shown as (a), (b) and (c) in FIG. 3, are superior in performance as compared with the charge and discharge characteristic (d) of the battery using the electrode obtained in Comparative Example 1 and not having a polymer layer and the charge and discharge characteristic (e) of the battery using the electrode obtained in Comparative Example 2 and provided with a polymer layer not having a crosslinked structure.

More particularly, from the charge and discharge characteristic (d) of the battery using the electrode obtained in Comparative Example 1 and not having a polymer layer it is seen that with increase in the number of charge and discharge cycles, there occur a change in shape due to dendrite and a sudden decrease of discharge capacity, eventually leading to a shorted state.

Also from the charge and discharge characteristic (e) using the electrode obtained in Comparative Example 2 and provided with a polymer layer not having a crosslinked structure it is seen that the effect of suppressing dendrite and shape charge of the polymer layer is not satisfactory and that the discharge capacity decreases markedly as the number of charge and discharge cycles increases.

On the other hand, in the case where the electrodes according to the present invention were used, a short circuit caused by dendrite did not occur, as is seen from (a), (b) and (c) in FIG. 3. Further, if a time point at which the discharge capacity became 60% of the initial discharge capacity is defined to be a cycle life, the cycle life of each of the batteries using the electrodes obtained in the foregoing Examples was twice or more as long as the cycle life of the batteries using electrodes not having a polymer layer.

What is claimed is:

1. A negative zinc electrode for an alkaline storage battery, comprising an electrode using zinc as an active material and a polymer layer formed on said electrode, said polymer layer containing at least a polymer having a crosslinked structure, wherein said polymer is selected from the group consisting of a polymer A having an ion conductivity of $10^{-3}$ to $10^1$ S/cm in an alkali electrolyte, a crosslinked polymer obtained by crosslinking the polymer A, a polymer A′ obtained by introducing a group B into a portion of a main chain of the polymer A, said group B being able to improve gas permeability, a polymer C having an oxygen permeability constant of larger than $1 \times 10^{-10}$ cm$^3$ (STP) cm$^{-1}$s$^{-1}$cmHg$^{-1}$, a crosslinked polymer obtained by crosslinking the polymer C, and a polymer C′ obtained by introducing a group D into a portion of a main chain of the polymer C, said group D being able to improve ion conductivity.

2. A negative zinc electrode as set forth in claim 1, wherein the polymer A is polyvinyl alcohol, polyacrylonitrile, carboxymethyl cellulose, polyacrylic acid, polyacrylate, polymethacrylic acid, polymethacrylate, polyvinyl pyrrolidone, polyparabanic acid, polyoxazoline, polyethylene oxide, or sodium polystyrenesulfonate.

3. A negative zinc electrode as set forth in claim 1, wherein the group B capable of improving gas permeability is —SiR$_3$, $\mathrm{-\!\!(\!OSi\!)\!\!_{\overline{n}}}$ OR′, —CH$_2$CH(CH$_3$)$_2$, where R and R′ are each a hydrogen atom or an alkyl group having 1 to 4 carbon atoms.

4. A negative zinc electrode as set forth in claim 1, wherein the polymer C is polyorganosiloxane, polyvinyltriorganosiloxane, polyalkylsulfone, or poly(4-methylpentene-1), having a molecular weight of about 1,000 to about 2,000,000.

5. A negative zinc electrode as set forth in claim 1, wherein the group D capable of improving ion conductivity is —COOH, —CN, —CONH$_2$ or —N$^+$R$_3$ where R is a hydrogen atom or an alkyl group having 1 to 4 carbon atoms.

6. A negative zinc electrode as set forth in claim 1, wherein the crosslinked structure is present substantially uniformly along the surface of the polymer layer and vicinity thereof.

7. A negative zinc electrode as set forth in claim 1, wherein the polymer layer has been obtained by forming on the electrode a coating of the polymer A, polymer A′, polymer C or polymer C′ and thereafter allowing a crosslinking reaction to take place.

8. A negative zinc electrode as set forth in claim 1, wherein the polymer layer further contains another polymer.

9. An alkaline storage battery comprising the zinc electrode described in claim 1, a separator, a positive electrode and an electrolyte.

* * * * *